(12) United States Patent
Nakamura (10) Patent No.: US 8,314,975 B2
(45) Date of Patent: Nov. 20, 2012

(54) OPTICAL SCANNING DEVICE AND IMAGE FORMING APPARATUS

(75) Inventor: Tadashi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 547 days.

(21) Appl. No.: 12/563,214

(22) Filed: Sep. 21, 2009

(65) Prior Publication Data

US 2010/0091342 A1  Apr. 15, 2010

(30) Foreign Application Priority Data

Oct. 15, 2008 (JP) ................................. 2008-266817

(51) Int. Cl.
 *H04N 1/04* (2006.01)
(52) U.S. Cl. ........ 358/474; 358/475; 358/528; 347/260; 399/151; 359/204.2
(58) Field of Classification Search .................. 358/474, 358/528, 3.2; 347/260, 247; 399/151; 359/204.2, 359/204.1, 196, 205, 215, 226, 203
See application file for complete search history.

(56) References Cited

U.S. PATENT DOCUMENTS

| | | | | |
|---|---|---|---|---|
| 4,848,879 A * | 7/1989 | Nishimura et al. | ........... | 359/289 |
| 4,902,084 A * | 2/1990 | Aharon | ....................... | 359/216.1 |
| 5,181,118 A * | 1/1993 | Kimura | ......................... | 348/243 |
| 5,255,108 A * | 10/1993 | Narayan et al. | .................. | 359/18 |
| 5,887,125 A * | 3/1999 | Takano et al. | ................. | 358/1.12 |
| 5,999,302 A * | 12/1999 | Sweeney et al. | ............ | 359/216.1 |
| 6,236,418 B1 * | 5/2001 | Yamakawa | ..................... | 347/129 |
| 6,625,331 B1 * | 9/2003 | Imaizumi et al. | .............. | 382/294 |
| 6,930,810 B1 * | 8/2005 | Hirayama | ...................... | 358/518 |
| 7,093,917 B2 * | 8/2006 | Yamada | .......................... | 347/19 |
| 7,379,085 B2 * | 5/2008 | Baretsky et al. | ............... | 347/249 |
| 7,471,434 B2 | 12/2008 | Nakamura et al. | | |
| 7,782,511 B2 * | 8/2010 | Otoguro | ..................... | 359/196.1 |
| 2007/0008361 A1 * | 1/2007 | Kawatoko et al. | ............... | 347/12 |
| 2007/0297036 A1 | 12/2007 | Nakamura et al. | | |
| 2008/0062491 A1 | 3/2008 | Nakamura et al. | | |
| 2008/0192323 A1 | 8/2008 | Nakamura et al. | | |
| 2008/0204841 A1 | 8/2008 | Suzuki et al. | | |
| 2008/0218829 A1 | 9/2008 | Nakamura | | |
| 2009/0015897 A1 | 1/2009 | Nakamura et al. | | |
| 2009/0073523 A1 | 3/2009 | Nakamura | | |
| 2009/0201358 A1 | 8/2009 | Nakamura | | |

FOREIGN PATENT DOCUMENTS

| | | |
|---|---|---|
| JP | 2002-258204 A | 9/2002 |
| JP | 2007-086335 A | 4/2007 |

\* cited by examiner

*Primary Examiner* — Negussie Worku
(74) *Attorney, Agent, or Firm* — Dickstein Shapiro LLP (57) ABSTRACT

A first main-scanning-position correction unit divides a surface to be scanned into first areas in a main scanning direction into areas, sets a separate clock-pulse timing for first area, and corrects a main-scanning position error. A second main-scanning-position correction unit divides the surface into second areas in the main scanning direction based on first-scanning-position correction data, sets a separate clock-pulse timing for each second area, and corrects the main-scanning position error.

20 Claims, 10 Drawing Sheets

AFTER BEING CORRECTED
WITH FIRST MAIN-SCANNING-
POSITION CORRECTION DATA VCLK

AFTER BEING CORRECTED
WITH SECOND MAIN-SCANNING-
POSITION CORRECTION DATA PCLK

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2008-266817 filed in Japan on Oct. 15, 2008.

BACKGROUND OF THE INVENTION

1. Field of the Invention

The present invention relates to an optical scanning device and an image forming apparatus in which the optical scanning device can be used.

2. Description of the Related Art

Conventionally, there is known an optical scanning device that deflects a light flux with a deflector such as an optical deflector, focuses the deflected light flux that is in the form of a microscopic spot light on a surface to be scanned, and scans the surface in a main scanning direction at a constant speed with the microscopic spot light by rotation of the deflector. The optical scanning device is used as a latent-image writing unit or the like in an image forming apparatus such as a laser beam printer, a laser beam plotter, a facsimile device, and a digital copier. The optical scanning device deflects and reflects a laser beam emitted from a laser light source by the optical deflector, to scan the surface of an image carrier or the like with the laser beam. At the same time, the optical scanning device writes an image onto the surface of an image carrier or the like by modulating an intensity (e.g., ON, OFF) of the laser beam according to image signals.

A rotating polygon mirror (polygon scanner) that is made to rotate at a constant speed is widely used as the optical deflector. However, the rotating polygon mirror is bulky and it is mechanically rotated at a high-speed. These facts lead to generation of banding due to oscillation, rise in temperature, generation of noise, and an increase in power consumption. Meanwhile, by using a micromirror, as a deflector of the optical scanning device, that has a resonance structure using a micromachining technique and sinusoidally oscillates, the device is downsized, and the banding due to the oscillation, the rise in temperature, the noise, and the power consumption can be largely reduced.

The micromirror (oscillating mirror) is superior as the deflector as mentioned above. However, with a micromirror it is difficult to optically and simultaneously correct both a deviation between image heights of a main-scanning beam spot diameter and a main-scanning position error. A technology for optically correcting the deviation between the image heights of the main-scanning beam spot diameter and electrically correcting the main-scanning position error to improve image quality is disclosed in Japanese Patent Application Laid-open No. 2002-258204 and Japanese Patent Application Laid-open No. 2007-086335. However, it is known that if a rotation angle of the micromirror is increased to widen a field angle in order to ensure a predetermined scan range, the main-scanning position error becomes prominent, and that even when electrical correction is performed, there occurs degradation in image quality such as uneven density due to a residual error. However, Japanese Patent Application Laid-open No. 2002-258204 and Japanese Patent Application Laid-open No. 2007-086335 do not discuss this matter. In addition, the scan range is divided into areas and a scanning position error is corrected for each divided area. In this case, if a division number (i.e., the number of areas in which the scan range is divided) is increased to narrow the areas, occurrence of the residual error can be reduced. However, in this approach, it is necessary to prepare a variable table for the division number, and thus, an increase in the division number leads to an increase in cost.

The electrical correction of the main-scanning position error taught by the technology described in Japanese Patent Application Laid-open No. 2002-258204 and some problems about the technology will be explained below.

Figure 10:
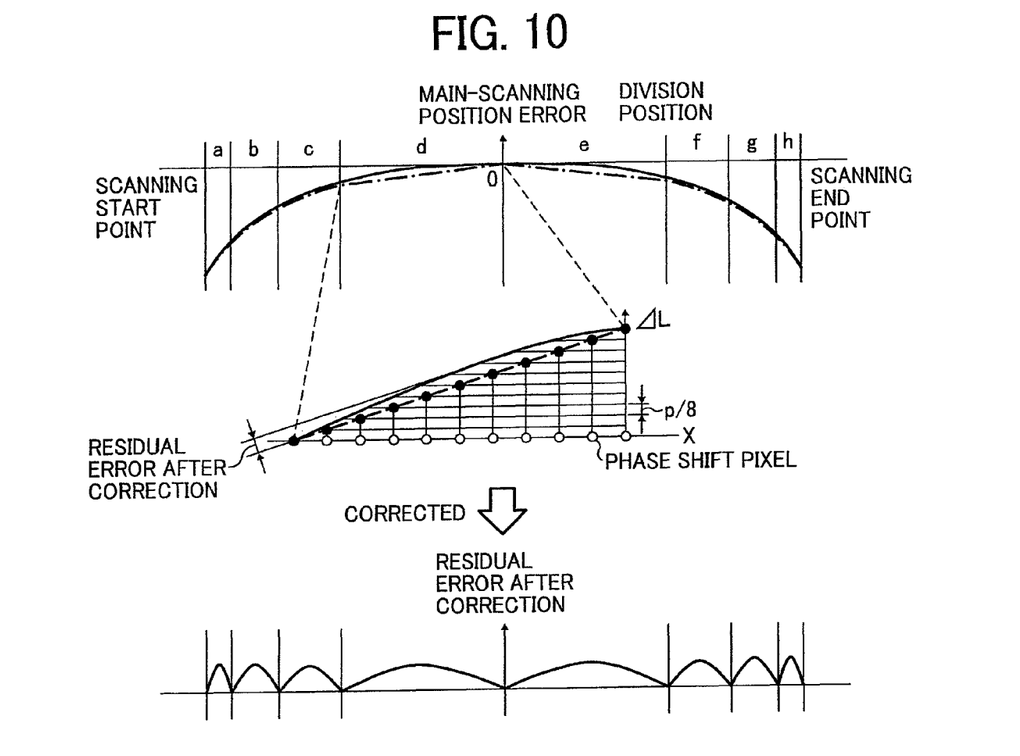
FIG. 10 is graphs representing a correction amount of the main-scanning position at each pixel according to the main scanning direction when the oscillating mirror is driven by a signal with a single frequency.

Because the oscillating mirror uses a resonance phenomenon and thereby sinusoidally oscillates, scanning speeds in the image heights are different from each other. For this reason, it is necessary to adjust dot positions in the main scanning direction. Therefore, dot position correction in the main scanning direction is concurrently performed as follows. FIG. 10 is a diagram for explaining a correction amount of a main scanning position in each pixel in the main scanning direction when the oscillating mirror is driven by a signal with a single frequency. The main-scanning area is divided into a plurality of areas, e.g., eight areas, and the number of phase shifts is set for each area and the displacements in the areas are corrected in a stepwise manner so that the overall displacement in the main-scanning direction becomes zero at each boundary between the areas by means of broken-line approximation.

For example, assuming $N_i$ to be the number of pixels in "i" area, a shift amount of each pixel to be $\frac{1}{8}$ units of a pixel pitch p, and $\Delta L_i$ to be a displacement between main-scanning reach positions at both ends of each area, the following equation is obtained:

$$n_i = N_i / (\Delta L_i / (p/8))$$

and, a phase is simply shifted for each $n_i$ pixel. Let $f_c$ be a pixel clock, then a phase difference $\Delta t$ as a total becomes as follows by using the number of times of phase shift $N_i/n_i$:

$$\Delta t = \frac{1}{16} f_c \times \int (N_i/n_i) di$$

and, a phase difference at an N-th dot pixel can also be set using the number of accumulations of the phase shift performed so far.

If the shift amount at each pixel is increased, the difference between pixels is easily noticeable on an image, and thus, the shift amount is desirably set to $\frac{1}{4}$ units or less of the pixel pitch p. Conversely, if the phase shift amount is decreased, the number of phase shift times is increased, which results in an increase in memory usage. Each width of divided areas may be equal to each other or may not be equal to each other. As shown in FIG. 10, by setting an area width of an area with a large main-scanning position error to be narrow and an area width of an area with a small main-scanning position error to be wide, it is possible to efficiently correct the main-scanning position error.

Figure 11:
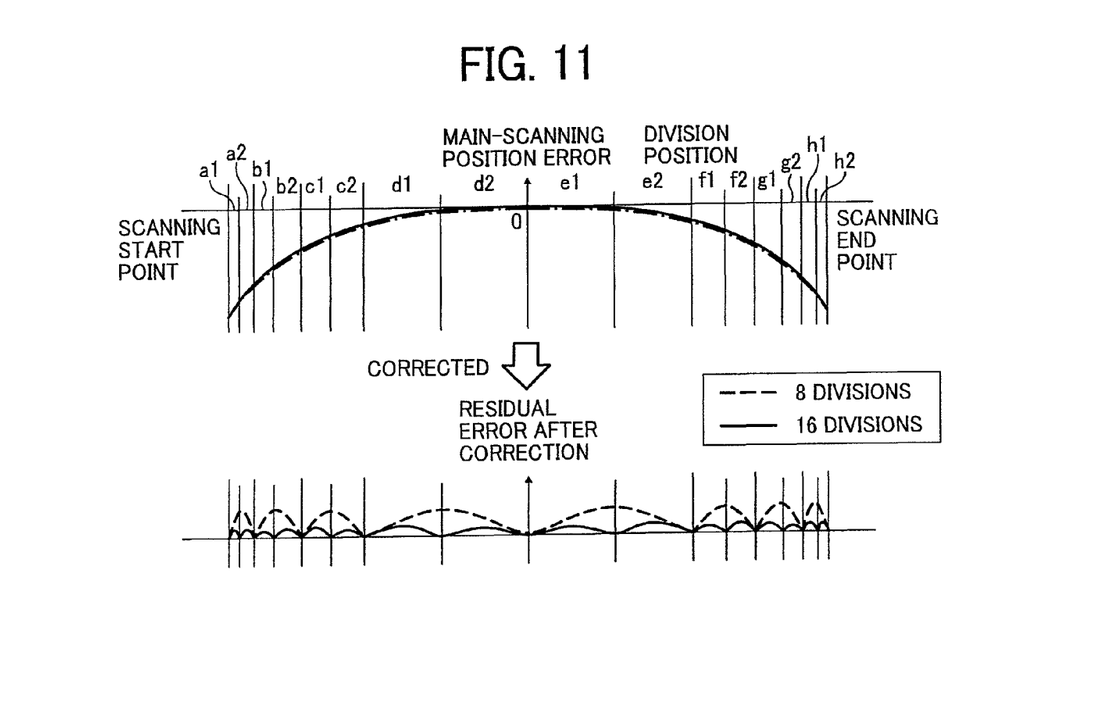
FIG. 11 is for explaining correction with increased division number in comparison to the situation shown in FIG. 10.

It is known that, by increasing the division number it is possible to further decrease the residual error after correction of the main-scanning position error. FIG. 11 represents a situation where the division number is 16. Specifically, FIG. 10 represents a situation where the division number is 8 (a, b, c, d, e, f, g, h) and FIG. 11 represents a situation where the division number is 16 (a1, a2, b1, b2, c1, c2, d1, d2, e1, e2, f1, f2, g1, g2, h1, h2). It is found that the residual error in case of 16 divisions is smaller than that in 8 divisions. In this manner, if the division number is increased, the residual error after correction in the main-scanning position error is reduced. However, if the division number is smaller, the small memory capacity is sufficient for each variable table with correction data in each divided area, which enables each variable table to be configured with low cost.

As explained above, to correct the main-scanning position error caused by the oscillating mirror, the division number needs to be increased and it is thereby difficult to realize the correction at a low cost. Such a problem as above is similar to that in the technology described in Japanese Patent Application Laid-open No. 2007-086335. There is a problem so far that it is difficult to correct the main-scanning position on the surface to be scanned with low cost and high precision when the oscillating mirror that sinusoidally oscillates is used, and that a formed image is low in quality.

The oscillating mirror also has a problem that its scanning characteristics as a single unit vary greatly with time.

SUMMARY OF THE INVENTION

It is an object of the present invention to at least partially solve the problems in the conventional technology.

According to an aspect of the present invention there is provided an optical scanning device including a light source configured to emit a light flux; a deflector configured to sinusoidally oscillate and thereby deflectively scan a surface to be scanned with the light flux emitted from the light source; a first correction unit configured to divide the surface into a plurality of first areas in a main scanning direction and set a separate clock-pulse timing for each of the first areas, and correct a main-scanning position error; and a second correction unit configured to divide the surface into a plurality of second areas in the main scanning direction based on first corrected data, set a separate clock-pulse timing for each of the second areas, and correct the main-scanning position error. The main-scanning position error is corrected by the second correction unit based on the first corrected data.

According to another aspect of the present invention there is provided an image forming apparatus including a process unit configured to execute an electrophotographic process; and the above optical scanning device as a unit that executes an exposing process of the electrophotographic process.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
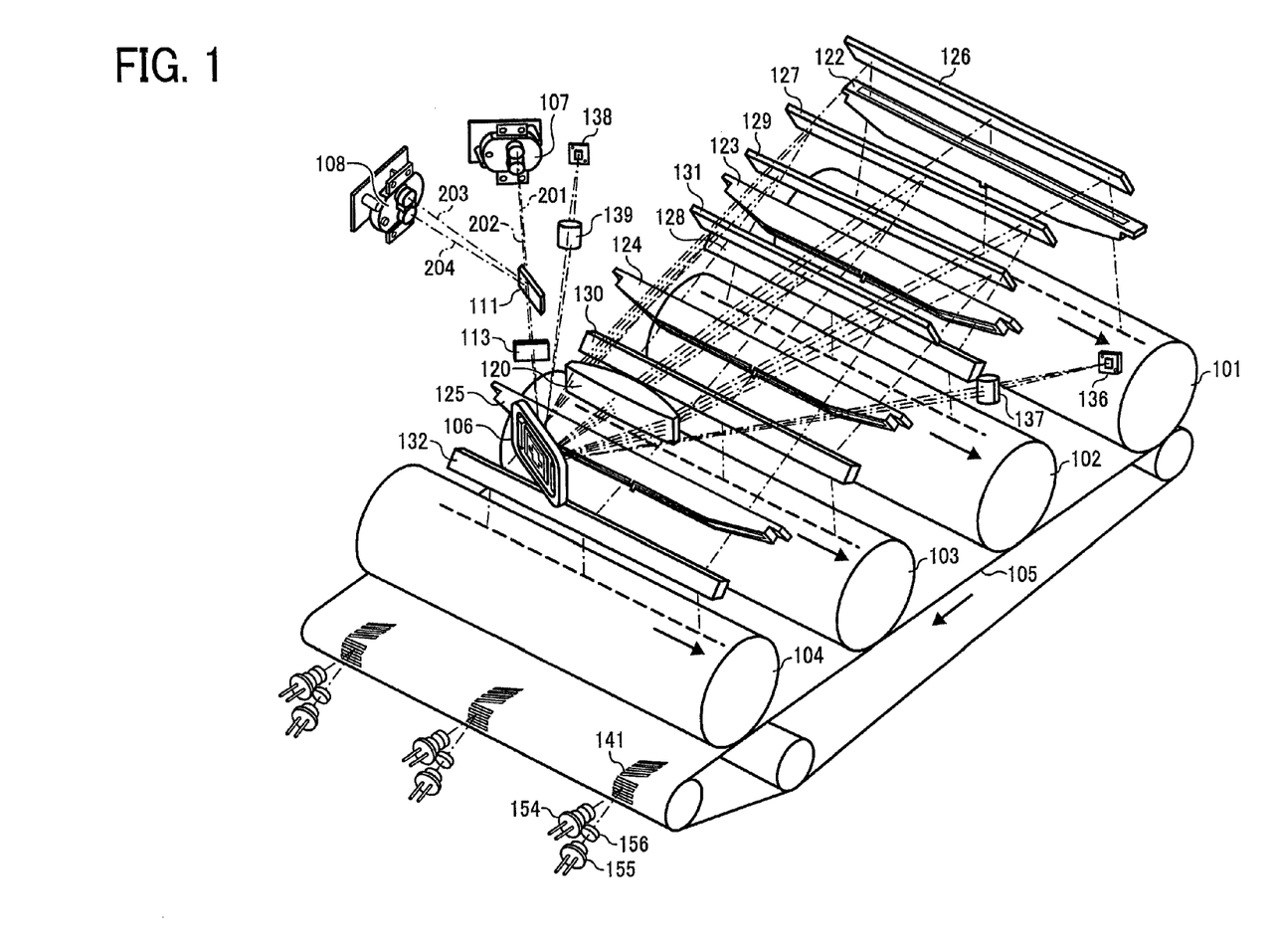
FIG. 1 is a schematic perspective view of an optical scanning device and relevant parts of an image forming apparatus according to an embodiment of the present invention.

FIG. 1 represents an optical scanning device according to a first embodiment of the present invention and relevant parts of an image forming apparatus that incorporates the optical scanning device. As an example, in the optical scanning device, four image forming stations are scanned with a single oscillating mirror. The optical scanning device scans surfaces of four photosensitive drums 101, 102, 103, and 104 with light beams, and it is configured by integrally incorporating optical devices that form the optical scanning device in a not shown housing. The four photosensitive drums 101, 102, 103, and 104 are arranged at constant intervals along a movement direction of an intermediate transfer belt 105.

The optical scanning device includes a light source unit 107 that emits a first pair of light beams 201 and 202, and a light source unit 108 that emits a second pair of light beams 203 and 204. Each of the light source units 107 and 108 includes a not shown light source such as a semiconductor laser and a not shown coupling lens for coupling light beams emitted from the light source to a subsequent optical system. The first pair of light beams 201 and 202 passes through a synthetic mirror 111 and the second pair of light beams 203 and 204 is reflected by the synthetic mirror 111. As a result, both the pairs of the light beams are synthesized. Each of the synthesized light beams is converged by a cylindrical lens 113 only in a sub-scanning direction, and a long linear image is formed near a reflecting surface of an oscillating mirror 106 in the main scanning direction.

The oscillating mirror 106 is driven so as to sinusoidally oscillate using the resonance phenomenon. Because of the oscillations, the light beams are reflected in the main scanning direction from the oscillating mirror 106. The four synthesized light beams strike the reflecting surface of the oscillating mirror 106 at different angles in the sub-scanning direction. Thus, the four synthesized light beams are deflected in the main scanning direction by the oscillating mirror 106 and are then separated again. The deflected light beams pass through a common first scanning lens 120, and then pass through mirrors 126, 127, 128, 129, 130, and 132, and through second scanning lenses 122, 123, 124, and 125, which are arranged corresponding to the light beams, so that the light beams are guided to the corresponding photosensitive drums 101, 102, 103, and 104, respectively.

The deflected light beams scan the surfaces of the corresponding photosensitive drums 101, 102, 103, and 104 in parallel to each center axis line of the four photosensitive drums in the main scanning direction. The four photosensitive drums are made to rotate around their center axes so as to be subjected to the sub scanning. The deflected light beams are modulated by image signals indicating color components corresponding to the light beams respectively. By scanning the light beams on the surfaces of the photosensitive drums in the main scanning and sub-scanning directions, two-dimensional images of corresponding color components are formed on the surfaces thereof, respectively.

As explained above, by causing the light beams emitted from the light source units obliquely incident on the oscillating mirror 106 at different incident angles in the sub-scanning direction, the light beams emitted from the light source units are collectively deflected and they scan the surfaces of the photosensitive drums. In this manner, one oscillating mirror 106 is used to scan a plurality of surfaces. This configuration leads to achievement of cost reduction. In addition, there is no need to match a resonance frequency, a drive frequency, an amplitude, and a deflection angle, which are necessary when a plurality of oscillating mirrors are employed instead of one oscillating mirror, and thus, shortening of manufacturing process and improvement of optical performance can be achieved.

The beams are converged near the surface of the oscillating mirror 106 by the cylindrical lens 113 in the sub-scanning direction. The beams after being deflected enter the first scanning lens 120 while widening each distance between the beams so that the beams separate from each other. The beams emitted from the light source units 107 and 108 and passing through the first scanning lens 120 form spots on the photosensitive drums 101 to 104 through the mirrors 126 to 132 and through the second scanning lenses 122 to 125, respectively, and latent images based on the image information are thereby formed on the photosensitive drums 101 to 104, respectively. To keep each main-scanning beam spot diameter uniform over the entire area on the surfaces to be scanned, fθ characteristics are provided to the first and the second scanning lenses 120 and 122 to 125.

Reference numerals 136 and 138 represent synchronization detection sensors. The light beams are deflected by the oscillating mirror 106, are made to pass by the first scanning lens 120, and are converged by imaging lenses 137 and 139, to enter the synchronization detection sensors 136 and 138, respectively, where detection signals are obtained. Synchronous detection signals for each of the image forming stations are generated based on the corresponding detection signals.

In the first embodiment, an anomorphic lens having different curvatures in the main scanning direction and the sub-scanning direction is used as the imaging lenses 137 and 139, to form images on the synchronization detection sensors 136 and 138 in both the main scanning direction and the sub-scanning direction, respectively. However, the image is not necessarily formed thereon in the sub-scanning direction in terms of a function of generating a horizontal synchronous detection signal, and thus, priority may be given to restriction such as a layout and an image is not thereby formed in the sub-scanning direction.

Although the image forming apparatus will be explained in more detail later, the latent images of the respective color components formed on the photosensitive drums 101 to 104 are developed with corresponding color toners, and obtained toner images are superposedly transferred to the intermediate transfer belt 105. A full color image can be formed in this manner. A detection unit is arranged in an exit roller portion of the intermediate transfer belt 105. The detection unit detects superimposition accuracy of the color images formed and superimposed on each other in the image forming stations. The detection unit reads a detection pattern 141 of the toner images superposedly formed on the intermediate transfer belt 105, and thereby detects a main-scanning registration and a sub-scanning registration as displacements from a station as a reference, so that correction is periodically performed.

In the first embodiment shown in FIG. 1, the detection unit includes a light-emitting diode (LED) device 154 for illumination, a photosensor 155 for receiving a reflected light beam, and a pair of condenser lenses 156. The detection unit is arranged at both right and left ends and at the center of an image forming range on the intermediate transfer belt 105. By reading a difference in detection time of each color from that of black as a reference color according to movement of the intermediate transfer belt 105, image misregistration between the image forming stations is detected.

Figure 2:
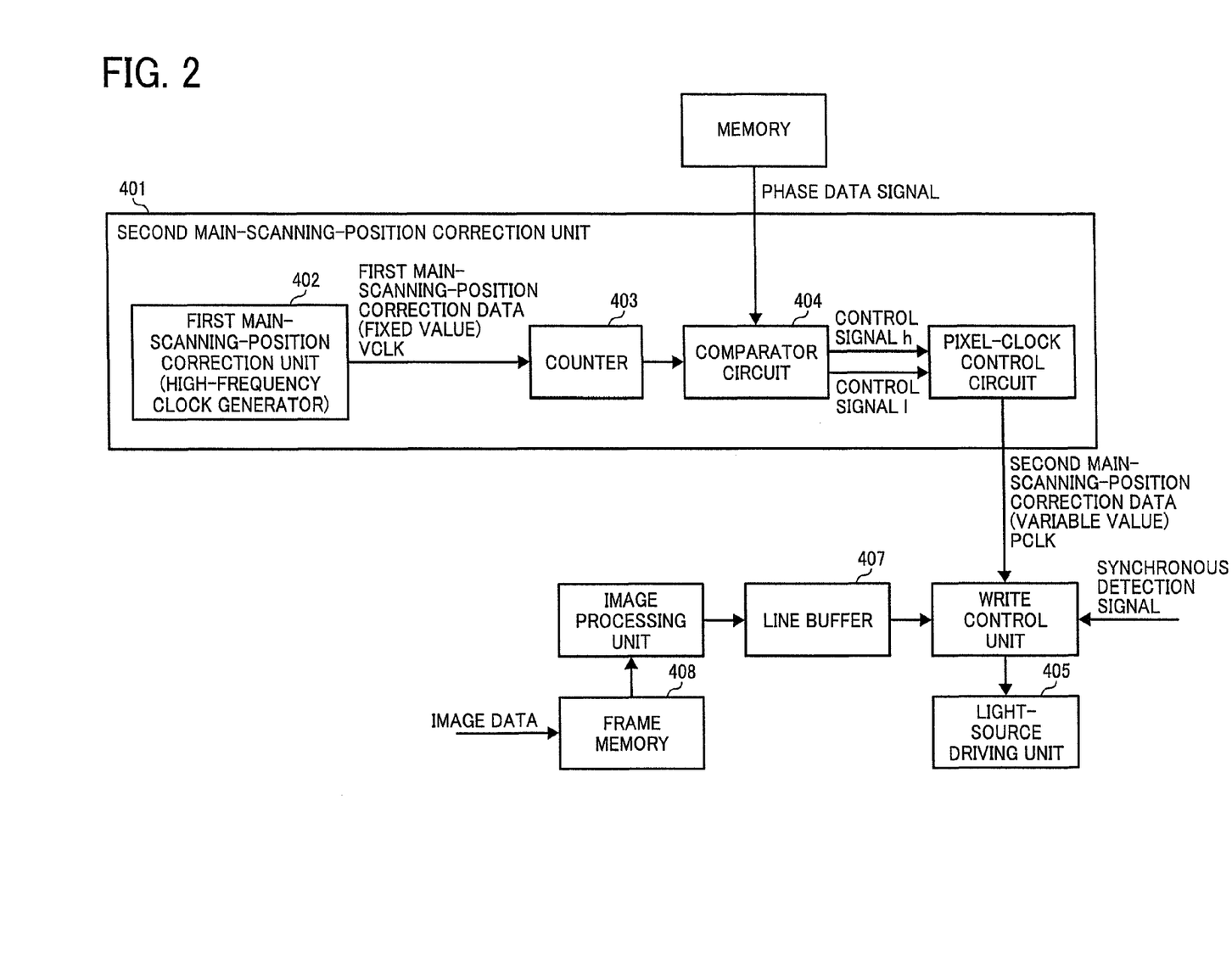
FIG. 2 is a block diagram of an exemplary drive circuit that modulates a semiconductor laser.

Next, how a main-scanning position error is corrected in the first embodiment is explained below. FIG. 2 is a block diagram of an exemplary drive circuit that modulates a semiconductor laser as a light source. Image data raster-expanded for each color is temporarily stored in a frame memory 408. The image data is sequentially read from the frame memory 408 by an image processing unit and image data for each line is formed according to a matrix pattern corresponding to a gray level while referring to a context. The formed image data is transferred to a line buffer 407 corresponding to each of the light-emitting sources. A write control unit reads the image data corresponding to each color component from the line buffer 407 using the synchronous detection signal as a trigger, independently modulates each light-emitting point in the light source unit, and causes the light source unit to emit a laser light flux modulated based on the image data.

Next, a second main-scanning-position correction unit 401 that functions as a clock generator that modulates each light-emitting point is explained below. Conventionally, a clock signal generated by a high-frequency clock generator 402 has a constant clock frequency in the entire area of the surface to be scanned. On the other hand, in the present embodiment, the high-frequency clock generator circuit 402 is used as a first main-scanning-position correction unit, the surface to be scanned is divided into number of areas equivalent to a first division number and a separate clock frequency is set in each of those areas. The reason is that, the scanning speed is delayed in the peripheral portion of an image due to sine-wave oscillation of the oscillating mirror so that a main-scanning position error occurs. This error is corrected by setting the clock frequency to a lower value in the peripheral portion of the image.

By setting the clock frequency in this manner, the main-scanning position error caused by scanning characteristics in design values of the oscillating mirror and that of the scanning lens can be corrected using first-scanning-position correction data VCLK being a fixed high-frequency clock. The setting of VCLK being a fixed value does not require the variable tables, and thus, even if the scan area is divided into more areas, this does not cause an increase in cost, and a residual error after correction can be reduced with low cost. The main-scanning position error due to a manufacturing error or the like is corrected in such a manner that the VCLK is set to the first-scanning-position correction data and is further corrected by the second main-scanning-position correction unit 401.

The second main-scanning-position correction unit 401 is configured as follows. A counter 403 counts the high-frequency clock VCLK generated by the high-frequency clock generator circuit 402. A comparator circuit 404 compares the count value, a set value L previously set based on a duty ratio, and phase data H being transition timing of a pixel clock for instructing a phase shift amount given from an external device. The comparator circuit 404 outputs a control signal 1 indicating a falling edge of a pixel clock PCLK when the count value coincides with the set value L, and outputs a control signal h indicating a rising edge of the pixel clock PCLK when the count value coincides with the phase data H.

At this time, the counter 403 is reset in response to output of the control signal h, and starts counting from zero again, thereby enabling to form a continuous pulse train. In this manner, the phase data H is provided for each clock to generate the pixel clock PCLK in which the pulse period is varied sequentially. In the first embodiment, the pixel clock PCLK is obtained by dividing the high-frequency clock VCLK by eight, so that the phase can be varied with a resolution of ⅛ clock.

Figure 3:
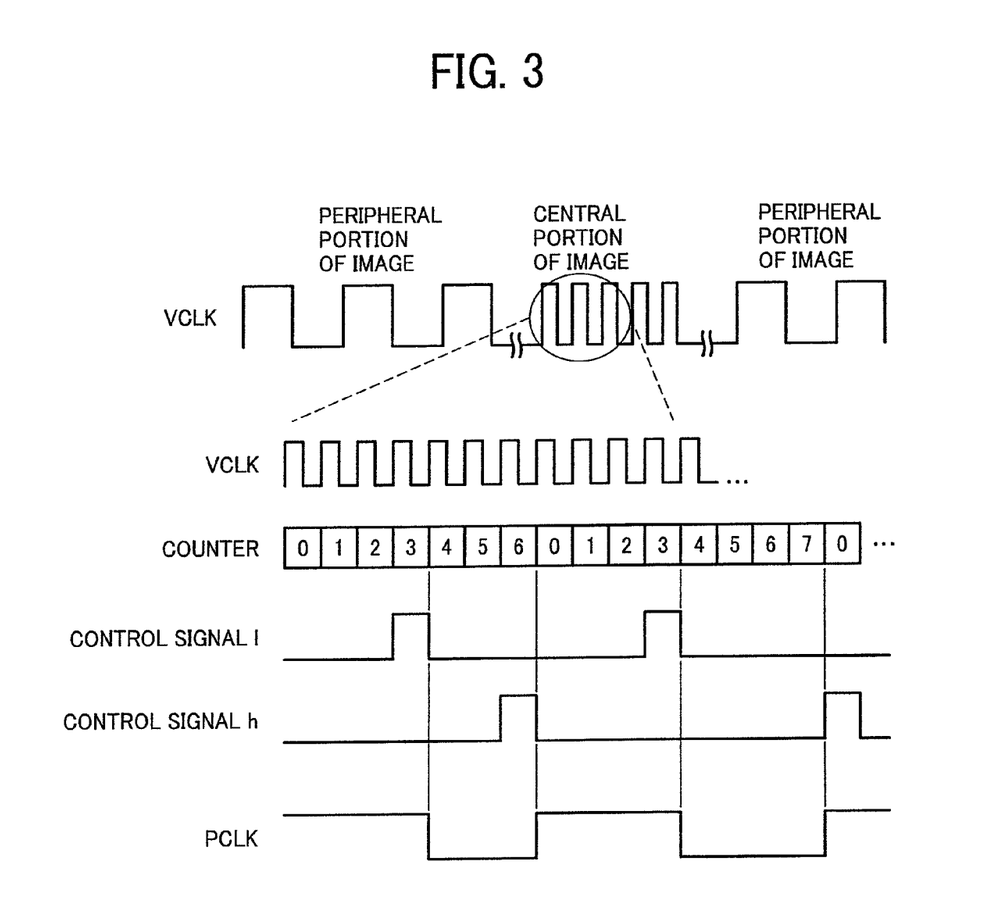
FIG. 3 is a timing chart of operations when a phase of an arbitrary pixel is shifted.

FIG. 3 represents an example in which the phase is delayed only by ⅛ clock in the explanation in which the phase of an arbitrary pixel is shifted. If the duty ratio is 50%, then the set value L=3 is provided, and the counter 403 counts four, to allow the pixel clock PCLK to fall. If the phase is delayed by ⅛ clock, then phase data H=6 is provided, to allow the phase to rise after seven counts. At the same time, because the counter 403 is reset, the pixel clock PCLK is again allowed to fall after four counts. Namely, an adjacent pulse period is shortened by ⅛ clock. The pixel clock PCLK generated in this manner is provided to a light-source driving unit 405 (see FIG. 2), and the semiconductor laser is driven by modulation data in which the pixel data read from the line buffer 407 is superimposed on the pixel clock PCLK.

Figure 4:
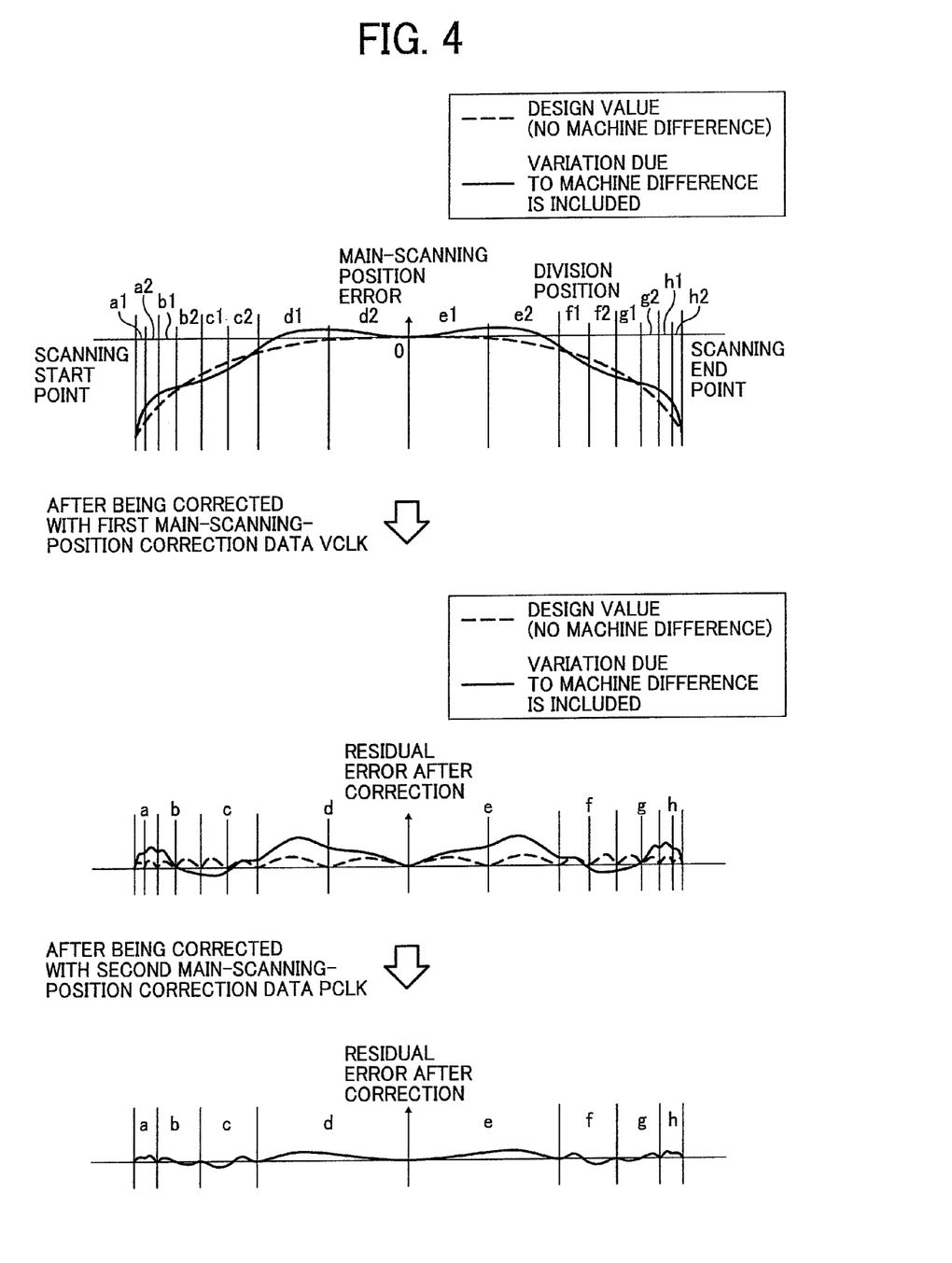
FIG. 4 is for explaining correction of a main-scanning position error in the embodiment.

FIG. 4 represents how the main-scanning position error is corrected in the stepwise manner as explained above. As shown in FIG. 4, a curve indicated by a dotted line is a design value of the main-scanning position error. Because the oscillating mirror 106 that sinusoidally oscillates is used for the deflector and the scanning lenses 120 and 122 to 125 are provided with the fθ characteristics, the scanning speed is getting slower as scanning from a central portion of the image to a peripheral portion of the image. Therefore, as represented by the dotted line in FIG. 4, the main-scanning position error based on the design value indicates quadratic functional characteristics.

Practically, variation due to a manufacturing error or the like is added to the characteristics indicated by the dotted line being the design value, to cause main-scanning position error characteristics including a higher-order component to become as represented by the curve indicated by a solid line in FIG. 4.

This error is first corrected by the first main-scanning-position correction unit 402 as shown in FIG. 2 (see the middle graph in FIG. 4). Here, first main-scanning-position correction data is set so that the surface to be scanned is divided into 16 and a secondary component being the design value is corrected. By setting the VCLK as the first main-scanning-position correction data, the residual error after correction of the design value indicated by the dotted line coincides with the residual error after correction obtained when the main-scanning position error occurring in a quadratic functional manner is corrected based on 16 divisions, as indicated by a solid line in FIG. 11. Practically, as explained above, the variation due to the manufacturing error or the like is added to the design value, to become the residual error after correction of the curve including the higher-order component indicated by the solid line in FIG. 4. There are many factors of the variation, such as individual differences of jitter of the oscillating mirror, individual differences of the scanning lens, and assembly errors of optical devices. Thus, satisfactory scanning characteristics cannot be stably obtained even if the main-scanning position error is caused by only the variation. Therefore, by driving the light source with the high-frequency clock VCLK and with second main-scanning-position correction data PCLK generated based on eight-divided variable tables, a final residual error after correction is further reduced (see the lower graph in FIG. 4).

Figure 5:
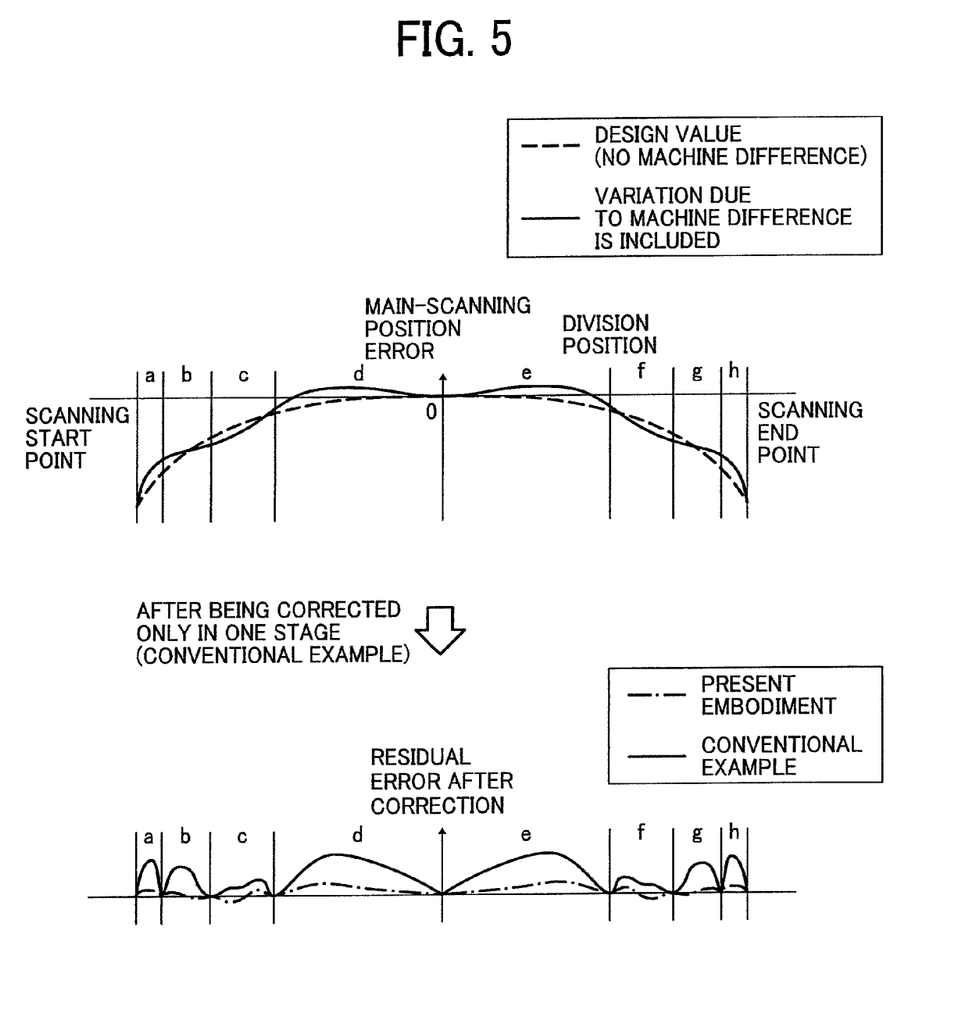
FIG. 5 is for explaining a conventional method of correction of the main-scanning position error.

The case of conventionally correcting the similar main-scanning position error is shown in FIG. 5 in order to compare the effect with the effect based on the conventional technology. The division number is set to eight being the second division number in FIG. 4, so that the cost is equivalent to the conventional one. As understood from the curve represented in the lower graph of FIG. 5, the correction error of the design value itself is large, and the residual error after correction remains large.

The output of the semiconductor laser is generally detected by a sensor for a light-amount monitor attached in one package for each scan of a back light and before a light beam is about to reach the image area. An amount of current to be applied to the light-emitting source is controlled so that the output of the semiconductor laser is maintained as a constant value during one-line recording.

Figure 6:
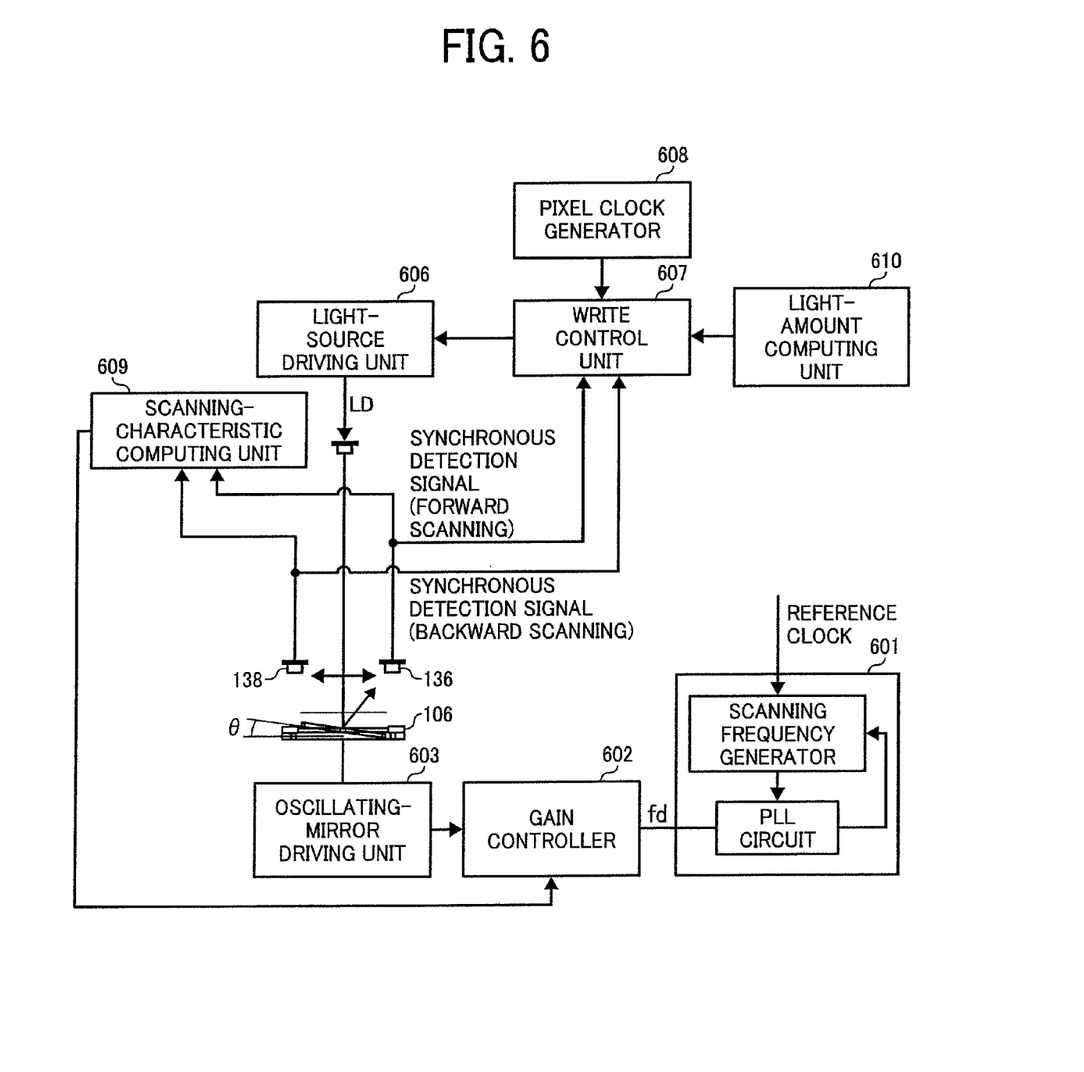
FIG. 6 is a block diagram of an exemplary drive circuit that oscillates a movable mirror that is applicable to the present invention.

FIG. 6 is a block diagram of an example of a drive circuit that oscillates a mirror. In FIG. 6, reference numeral 106 represents an oscillating mirror, 601: a scanning frequency generator, 602: a gain controller, 603: an oscillating-mirror driving unit, 136 and 138: synchronization detection sensors, 606: a light-source driving unit, 607: a write control unit, 608: a pixel clock generator, 609: a scanning-characteristic computing unit, and 610: a light-amount computing unit. An alternating-current voltage or a pulse wave voltage is applied to the oscillating mirror 106, and a gain is controlled so that an amplitude, the center of the amplitude, and a phase of the oscillating mirror 106 are constant, to allow the oscillating mirror 106 to oscillate forward and backward.

Figure 7:
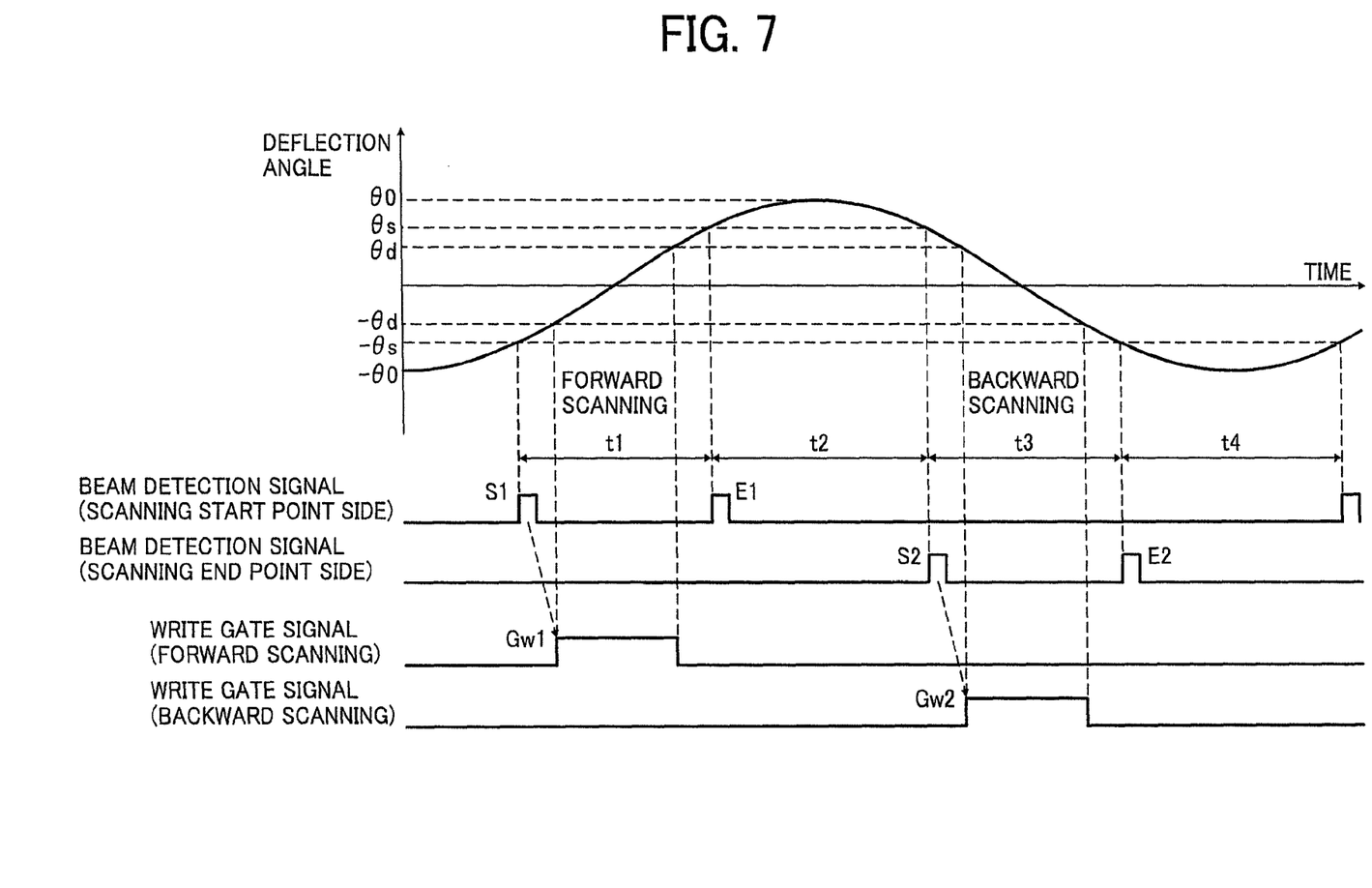
FIG. 7 is a timing chart of operations for generating a write timing signal from a synchronous detection signal in the embodiment.

FIG. 7 is a timing chart when required write timing signals are respectively generated from synchronous detection signals. Signs S1 and E2 represent detection signals of the synchronization detection sensor 136, S2 and E1: detection signals of the synchronization detection sensor 138, Gw1 and Gw2: write gate signals, θO: a maximum amplitude of the oscillating mirror, θs: a deflection angle of the oscillating mirror when the beam enters the synchronization detection sensor, and θd: a maximum deflection angle for scanning an effective scan area. An arrow with a dotted line in FIG. 7 indicates a relation in which a signal is generated. When receiving the detection signal S1 from the synchronization detection sensor 136 at the scanning start point upon forward scanning, the write control unit 607 generates the write gate signal Gw1 for backward scanning. The detection signal S1 and the write gate signal Gw1 are generally concurrently generated, however, if there is a pitch (displacement) in the main scanning direction between channels of the multibeam like a semiconductor laser array, a predetermined time difference (delay) between the signals S1 and Gw1 can also be provided by counting a reference clock if necessary.

When receiving the detection signal S2 from the synchronization detection sensor 138 at a scanning start point upon backward scanning, the write control unit 607 generates the write gate signal Gw2 for forward scanning. In this case, also, a predetermined time difference can be provided between the signal S2 and the signal Gw2. By detecting deference between times at which the signals are detected by the synchronization detection sensors at a scanning start point and a scanning end point or by detecting a scanning time of the light beam, variation of the deflection angle θO of the oscillating mirror 106 can be detected. The deflection angle θ of the oscillating mirror 106 is expressed by:

$$\theta = \theta O \cdot \sin(2\pi f d \cdot t/2),$$

where fd is a drive frequency of the oscillating mirror, and by detecting a time when θ=θs, an amplitude θO can be calculated because the deflection angle θs is constant.

The center of the amplitude of the oscillating mirror 106 can be controlled so as not to vary over time by detecting times t2 and t4 and controlling the times t2 to t4 so as to be constant. The time t2 indicates a time from starting the deflection angle θs upon the forward scanning due to oscillation of the oscillating mirror to reaching the deflection angle θs by switching the scanning direction to the backward scanning. The time t4 indicates a time from starting a deflection angle −θs upon the backward scanning due to oscillation of the oscillating mirror to reaching the deflection angle −θs by switching the scanning direction to the forward scanning.

The phase of the oscillating mirror can be matched to a reference clock by referring to the reference clock and by forming the scanning frequency generator 601 also with a phase locked loop (PLL) circuit as shown in FIG. 6. To control the oscillating mirror 106 with higher precision, scanning times t1 and t3 upon the forward scanning and the backward scanning may be detected to increase a sampling frequency. The scanning time t1 is a time from an output of the detection signal S1 of the synchronization detection sensor 136 to an output of the detection signal E1 of the synchronization detection sensor 138 during the forward scanning. The scanning time t3 is a time from an output of the detection signal S2 of the synchronization detection sensor 138 to an output of the detection signal E2 of the synchronization detection sensor 136 during the backward scanning.

In the first embodiment, the fθ characteristics are provided to the scanning lenses 120 and 122 to 125, however, the fθ characteristics are not necessarily provided to them. According to a second embodiment of the present invention, to reduce the cost, for example, it is effective to reduce the second division number. To achieve the reduction, it is also possible to generate a deviation between image heights of the main-scanning beam spot diameter to an acceptable level and also optically correct the main-scanning position error accordingly.

Figure 8:
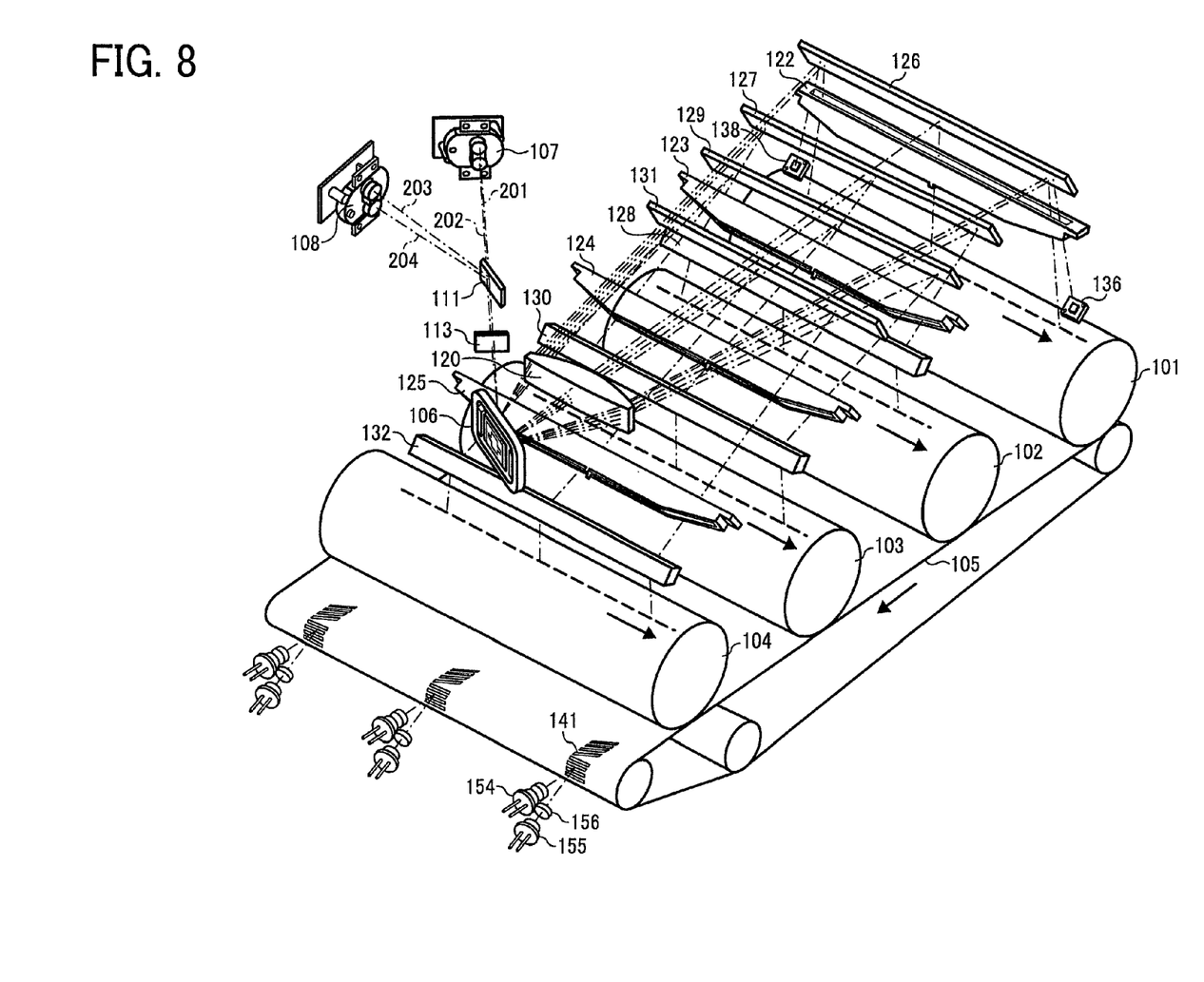
FIG. 8 is a schematic perspective view of an optical scanning device and relevant parts of an image forming apparatus according to a third embodiment of the present invention.

In the first embodiment, the beams used to detect synchronization do not pass through the scanning lens, but are formed on the imaging lens for synchronization-detection light flux. However, according to a third embodiment of the present invention, the optical scanning device may be configured as shown in FIG. 8 to correct the main-scanning position error including a main-scanning position error caused by the scanning lens. More specifically, one of the scanning beams having passed through the scanning lens 120 common to all the scanning beams, such as a light beam reflected by the mirror 126, passing through the second scanning lens 122, and reaching the photosensitive drum 101, may be guided to the synchronization detection sensors 136 and 138. The synchronization detection sensors 136 and 138 are arranged outside a write range of the photosensitive drum 101.

Figure 9:
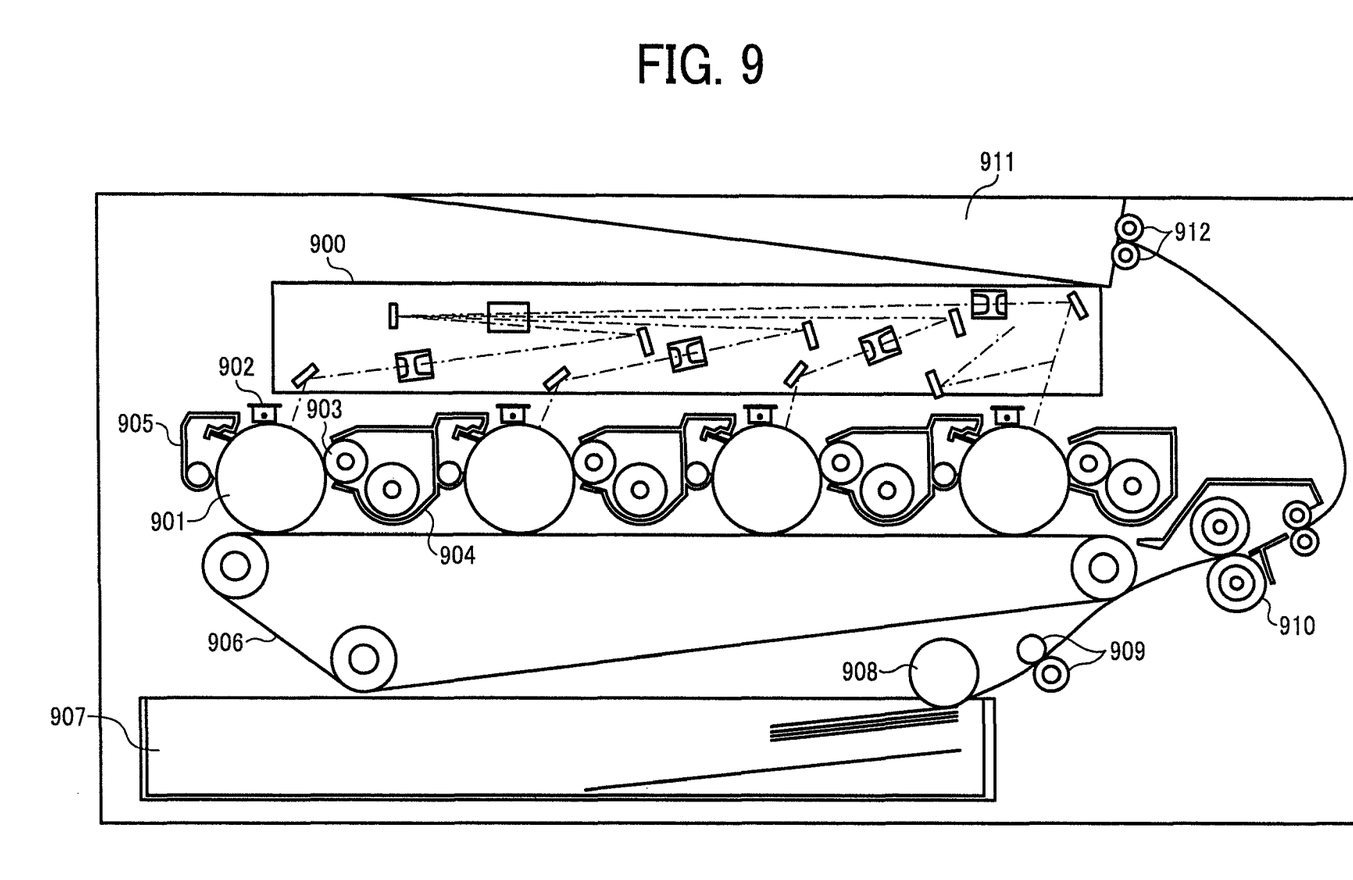
FIG. 9 is a schematic front view of an image forming apparatus according to a fourth embodiment of the present invention.

FIG. 9 represents an image forming apparatus provided with the optical scanning device according to a fourth embodiment of the present invention. The image forming apparatus is a full-color image forming apparatus with four image forming stations provided therein. The configurations and the image forming processes of the stations are the same as each other, and thus, one of the stations will be specifically explained. Arranged around a photosensitive drum 901 in FIG. 9 are a charging charger 902 that applies a high voltage to the photosensitive drum 901, a developing roller 903 that causes charged toner to adhere to an electrostatic latent image recorded by an optical scanning device 900 to visualize the latent image, a toner cartridge 904 that supplies toner to the developing roller 903, and a cleaning case 905 that stores therein scraped toner remaining on the photosensitive drum. The oscillating mirror 106 is scanned forward and backward by the optical scanning device 900 to record images in the photosensitive drum 901 for every two lines in one period.

The image forming stations are arranged in a row along the upper side of a transfer belt 906 in a movement direction of the transfer belt 906 along which each of the photosensitive drums is arranged at each center of the respective image forming stations. Toner images of yellow, magenta, cyan, and black formed on the photosensitive drums of the image forming stations are sequentially transferred to the transfer belt 906 at each timing, and are superimposed on each other, so that a color image is formed. The image forming stations have basically the same configuration as each other except for toner color.

A paper feed tray 907 is provided in the bottom of the image forming apparatus, a recording paper is fed out from the paper feed tray 907 by a paper pickup roller 908 sheet by sheet, and is fed out by a registration roller pair 909 at timing of starting recording in the sub-scanning direction. The toner images are transferred to the recording paper from the transfer belt 906 and are fixed on the recording paper by a fixing roller 910, and the recording paper with the toner images fixed thereon is ejected to a paper ejection tray 911 by a paper ejection roller 912.

The charging charger 902, the developing roller 903, the cleaning case 905, the transfer belt 906, the fixing roller 910, and the optical scanning device 900 arranged around each of the photosensitive drums form process units for executing a series of electrophotographic processes including charging, exposing, developing, transferring, fixing, and cleaning. The optical scanning device 900 executes the exposing process in the electrophotographic processes.

Although FIG. 9 represents the fourth embodiment of the image forming apparatus of a full-color tandem type, the optical scanning device according to the present invention can also be applied as an optical writing device in monochrome machines.

According to an aspect of the present invention, the scan area is divided into plural areas to correct the main-scanning position error of a design-center value, light-source drive patterns of the divided areas are fixed, and only the main-scanning position error caused by a variation in tolerance is corrected by referring to the variable table divided into an appropriate number, so that it is possible to prevent degradation in image quality such as uneven density with cost equivalent to the conventional one.

According to another aspect of the present invention, the variable table is provided only in the second main-scanning-position correction unit, so that the memory space required to store the variable table can be reduced, thus preventing an increase in cost.

According to another aspect of the present invention, by setting the second division number to a lower value, the memory space required to store the variable table can be reduced accordingly, thus preventing an increase in cost.

According to another aspect of the present invention, the first main-scanning-position correction unit can be set so as to correct scanning characteristics in which the scanning speed is the maximum at the center of the surface to be scanned which is specific to the micromirror.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source configured to emit a light flux; and
   a deflector configured to sinusoidally oscillate and thereby deflectively scan a surface to be scanned with the light flux emitted from the light source; and
   wherein the optical scanning device includes a first correction unit configured to divide the surface into a plurality of first areas in a main scanning direction and set a separate clock-pulse timing for each of the first areas, and correct a main-scanning position error, and generate first corrected data;
   wherein the scanning device includes a second correction unit configured to divide the surface into a plurality of second areas in the main scanning direction based on the first corrected data, set a separate clock-pulse timing for each of the second areas, and correct residual main-scanning error after being corrected by the first correction unit; and
   wherein the main-scanning position error is corrected by the second correction unit based on the first corrected data.

2. The optical scanning device according to claim 1, wherein the first correction unit corrects a secondary component of the main-scanning position error and the second correction unit corrects a higher-order component of the main-scanning position error.

3. The optical scanning device according to claim 1, wherein a variable table is provided only in the second main-scanning-position correction unit.

4. The optical scanning device according to claim 1, wherein the second areas are smaller in number than the first areas.

5. The optical scanning device according to claim 1, wherein the first correction unit sets a light-source drive frequency for driving the light source lower in a peripheral portion than that in a central portion of the surface.

6. The optical scanning device according to claim 1, further comprising an imaging unit having fθ characteristics and configured to focus the light flux deflected by the deflector onto the surface thereby forming an image on the surface.

7. The optical scanning device according to claim 1, further comprising a scanning-characteristic control unit configured to maintain scanning characteristics of the deflector constant over time.

8. The optical scanning device according to claim 7, wherein the scanning characteristics of the deflector include one or more of an amplitude, a center of the amplitude, and phase of the deflector.

9. The optical scanning device according to claim 7, further comprising a plurality of detection units configured to detect scanning positions and output a detection signal to the scanning-characteristic control unit.

10. The optical scanning device according to claim 9, wherein one of the detection signals is set as a horizontal synchronization signal for determining image write timing, and an image is written onto the surface only in forward scanning or backward scanning.

11. The optical scanning device according to claim 9, wherein, among the detection signals, a detection signal right before image writing is set as a horizontal synchronization signal for determining image write timing, and an image is written onto the surface in forward scanning and backward scanning.

12. An image forming apparatus comprising:
    a process unit configured to execute an electrophotographic process; and
    an optical scanning device as a unit that executes an exposing process of the electrophotographic process; and
    wherein the optical scanning device includes: a light source configured to emit a light flux; a deflector configured to sinusoidally oscillate and thereby deflectively scan a surface to be scanned with the light flux emitted from the light source; a first correction unit configured to divide the surface into a plurality of first areas in a main scanning direction and set a separate clock-pulse timing for each of the first areas, and correct a main-scanning position error; and a second correction unit configured to divide the surface into a plurality of second areas in the main scanning direction based on first corrected data, set a separate clock-pulse timing for each of the second areas, and correct the main-scanning position error, wherein the main-scanning position error is corrected by the second correction unit based on the first corrected data.

13. An optical scanning device comprising:
    a light source configured to emit a light flux;
    a deflector configured to sinusoidally oscillate and thereby deflectively scan a surface to be scanned with the light flux emitted from the light source;
    a first correction unit configured to divide the surface into a plurality of first areas in a main scanning direction and set a separate clock-pulse timing for each of the first areas, and correct a main-scanning position error; and
    a second correction unit configured to divide the surface into a plurality of second areas in the main scanning direction based on first corrected data, set a separate clock-pulse timing for each of the second areas, and correct the main-scanning position error,
    wherein the main-scanning position error is corrected by the second correction unit based on the first corrected data, and wherein the first correction unit determines a clock frequency for each of the first areas and the second correction unit corrects the main-scanning position error based on the clock frequency determined by the first correction unit.

14. The image forming apparatus according to claim 12, wherein the first correction unit determines a clock frequency for each of the first areas and the second correction unit corrects the main-scanning position error based on the clock frequency determined by the first correction unit.

15. The image forming apparatus according to claim 12, wherein the first correction unit corrects a secondary component of the main-scanning position error and the second correction unit corrects a higher-order component of the main-scanning position error.

16. The image forming apparatus according to claim 12, wherein a variable table is provided only in the second main-scanning-position correction unit.

17. The image forming apparatus according to claim 12, wherein the second areas are smaller in number than the first areas.

18. The image forming apparatus according to claim 12, wherein the first correction unit sets a light-source drive frequency for driving the light source lower in a peripheral portion than that in a central portion of the surface.

19. The image forming apparatus according to claim 12, further comprising an imaging unit having fθ characteristics and configured to focus the light flux deflected by the deflector onto the surface thereby forming an image on the surface.

20. The image forming apparatus according to claim 12, further comprising a scanning-characteristic control unit configured to maintain scanning characteristics of the deflector constant over time.

* * * * *